(12) United States Patent
Cheng et al.

(10) Patent No.: US 11,664,559 B2
(45) Date of Patent: May 30, 2023

(54) BATTERY MODULE WITH JUMPER ELECTRODE CONNECTOR, AND INSULATING STRUCTURE PROVIDED BETWEEN JUMPER ELECTRODE CONNECTOR AND BATTERY

(71) Applicants: CALB Technology Co., Ltd., Jiangsu (CN); CALB Co., Ltd., Jiangsu (CN)

(72) Inventors: Keqiang Cheng, Changzhou (CN); Xiaoyuan Du, Luoyang (CN); Yong Cao, Changzhou (CN)

(73) Assignees: CALB Technology Co., Ltd., Jiangsu (CN); CALB Co., Ltd., Jiangsu (CN)

( * ) Notice: Subject to any disclaimer, the term of this patent is extended or adjusted under 35 U.S.C. 154(b) by 239 days.

(21) Appl. No.: 17/138,827

(22) Filed: Dec. 30, 2020

(65) Prior Publication Data

US 2021/0399388 A1 Dec. 23, 2021

(30) Foreign Application Priority Data

Jun. 19, 2020 (CN) .......................... 202021160868.5
Nov. 24, 2020 (CN) .......................... 202022749448.7

(51) Int. Cl.
*H01M 50/503* (2021.01)
*H01M 50/209* (2021.01)
*H01M 50/509* (2021.01)

(52) U.S. Cl.
CPC .............................. *H01M 50/503* (2021.01)

(58) Field of Classification Search
CPC . H01M 50/503; H01M 50/509; H01M 50/507
See application file for complete search history.

(56) References Cited

U.S. PATENT DOCUMENTS

| 11,469,471 | B1 * | 10/2022 | Miler | H01M 50/24 |
| 2010/0323234 | A1 * | 12/2010 | Kim | H01M 50/528 |
| | | | | 429/158 |

(Continued)

FOREIGN PATENT DOCUMENTS

| CN | 110277533 | 9/2019 |
| CN | 110911624 | 3/2020 |

(Continued)

OTHER PUBLICATIONS

"Search Report of Europe Counterpart Application", dated Jul. 9, 2021, pp. 1-8.

*Primary Examiner* — Imran Akram
(74) *Attorney, Agent, or Firm* — JCIP Global Inc.

(57) ABSTRACT

The disclosure discloses a battery module. The electrical connection between a first electrode of a first battery and a second electrode of a second battery can be realized by setting a jumper electrode connector, thereby facilitating realization of connection relationship of multiple batteries. Moreover, an insulating structure is provided between the jumper electrode connector and the battery. Also, the jumper electrode connector includes a first through hole, the orthographic projection of the first through hole and the orthographic projection of the explosion-proof valve at least partially overlap each other, and the orthographic projection of the first through hole overlaps the orthographic projection of the insulating structure.

17 Claims, 9 Drawing Sheets

(56) References Cited

U.S. PATENT DOCUMENTS

| | | | |
|---|---|---|---|
| 2012/0298433 A1* | 11/2012 | Ohkura | H01M 10/6556 180/65.21 |
| 2013/0164595 A1* | 6/2013 | Takase | H01M 10/6554 429/120 |
| 2015/0072177 A1* | 3/2015 | Soleski | H01M 50/367 429/7 |
| 2015/0372268 A1* | 12/2015 | Ichikawa | H01M 50/209 429/87 |
| 2016/0124023 A1* | 5/2016 | Sato | G01R 31/364 324/126 |
| 2017/0141367 A1* | 5/2017 | Kim | H01M 50/262 |
| 2019/0157636 A1* | 5/2019 | Miler | H01M 50/30 |
| 2019/0198844 A1 | 6/2019 | Hsu | |
| 2019/0198845 A1 | 6/2019 | Bae et al. | |
| 2019/0305287 A1* | 10/2019 | Matsui | H01M 50/512 |
| 2020/0091489 A1 | 3/2020 | Zeng et al. | |
| 2020/0350530 A1* | 11/2020 | Kim | H01M 50/262 |
| 2021/0126328 A1* | 4/2021 | Egashira | H01M 50/512 |
| 2021/0305654 A1* | 9/2021 | Iwatsuki | H01M 50/35 |

FOREIGN PATENT DOCUMENTS

| | | |
|---|---|---|
| CN | 110911625 | 3/2020 |
| EP | 3506383 | 7/2019 |

\* cited by examiner

BATTERY MODULE WITH JUMPER ELECTRODE CONNECTOR, AND INSULATING STRUCTURE PROVIDED BETWEEN JUMPER ELECTRODE CONNECTOR AND BATTERY

CROSS-REFERENCE TO RELATED APPLICATION

This application claims the priority benefit of Chinese application serial no. 202021160868.5, filed on Jun. 19, 2020, and Chinese application serial no. 202022749448.7, filed on Nov. 24, 2020. The entirety of each of the above-mentioned patent applications is hereby incorporated by reference herein and made a part of this specification.

BACKGROUND

Technical Field

The disclosure relates to the technical field of batteries, in particular to a battery module.

Related Art

A battery module can typically include multiple batteries, and the connection relationship between the batteries can mainly include: series connection between batteries; or series connection between some batteries and parallel connection between some batteries. Specifically, in order to realize the above-mentioned connection relationship of the batteries, electrode connectors required in this regard. In that case, how to arrange the electrode connectors to achieve the connection relationship of the batteries while optimizing the structure of the battery module is an urgent technical issue to be solved by practitioners of the field.

SUMMARY OF THE DISCLOSURE

An embodiment of the disclosure provides a battery module for arranging electrode connectors, which optimizes the structure of the battery module while realizing the connection relationship of the batteries.

An embodiment of the disclosure provides a battery module, including: a jumper electrode connector, a first battery and a second battery.

The jumper electrode connector includes a first terminal and a second terminal, the first terminal is electrically connected to a first electrode of the first battery, and the second terminal is electrically connected to a second electrode of the second battery.

The jumper electrode connector includes a first through hole, an orthographic projection of the first through hole on a first surface and an orthographic projection of an explosion-proof valve on the first surface at least partially overlap each other, and the first battery and/or the second battery include the explosion-proof valve. The first surface is: a surface of the battery module provided with the jumper electrode connector.

An insulating structure is provided between the jumper electrode connector and the battery, the battery is the first battery and/or the second battery, and the orthographic projection of the first through hole on the first surface overlaps with an orthographic projection of the insulating structure on the first surface.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF EMBODIMENTS

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

The specific implementation of a battery module provided in the embodiments of the disclosure will be described in detail below in conjunction with the accompanying drawings. It should be noted that the described embodiments are only a part of the embodiments of the disclosure, rather than all the embodiments. Based on the embodiments of the disclosure, all other embodiments obtained by those of ordinary skill in the art without inventive effort shall fall within the protection scope of the disclosure.

The technical solutions of the presented embodiments have the following advantageous effects.

The battery module provided in the embodiment of the disclosure can realize the electrical connection between the first electrode of the first battery and the second electrode of the second battery through the arrangement of the jumper electrode connector, thereby facilitating realization of the connection relationship of the multiple batteries. Moreover, since an insulating structure is provided between the jumper electrode connector and the battery, the insulating structure can provide insulation protection between the jumper electrode connector and the battery, and further protect the battery module, so as to prevent foreign matter from entering the battery module, thereby improving the reliability of the battery module. In addition, since the jumper electrode connector includes the first through hole, the orthographic projection of the first through hole and the orthographic projection of the explosion-proof valve at least partially overlap each other, and the orthographic projection of the first through hole overlaps the orthographic projection of the insulating structure. Therefore, when the explosion-proof valve is opened, the gas and liquid released by the explosion-proof valve can break through the insulating structure and then be released through the first through hole, such that the safety of battery module can be ensured.

Figure 1:
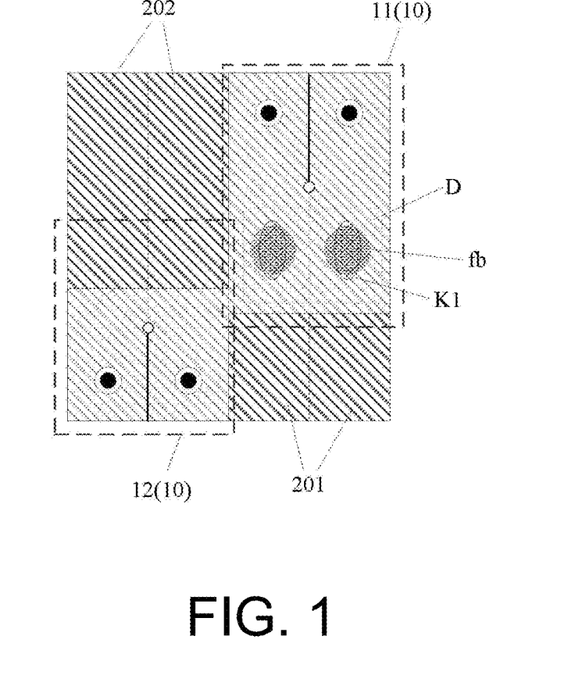
FIG. 1 is a schematic structural view of the first battery module provided in an embodiment of the disclosure.
Figure 2:
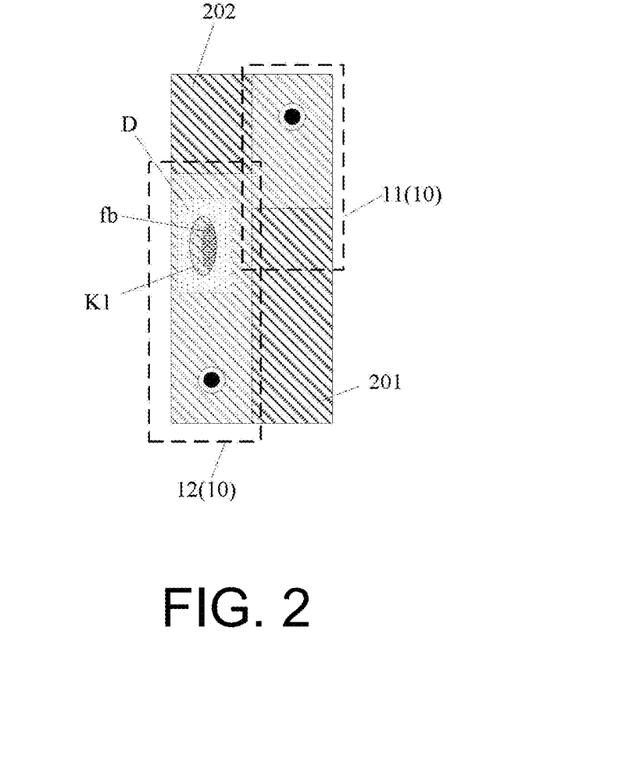
FIG. 2 is a schematic structural view of a second battery module provided in an embodiment of the disclosure.
Figure 3:
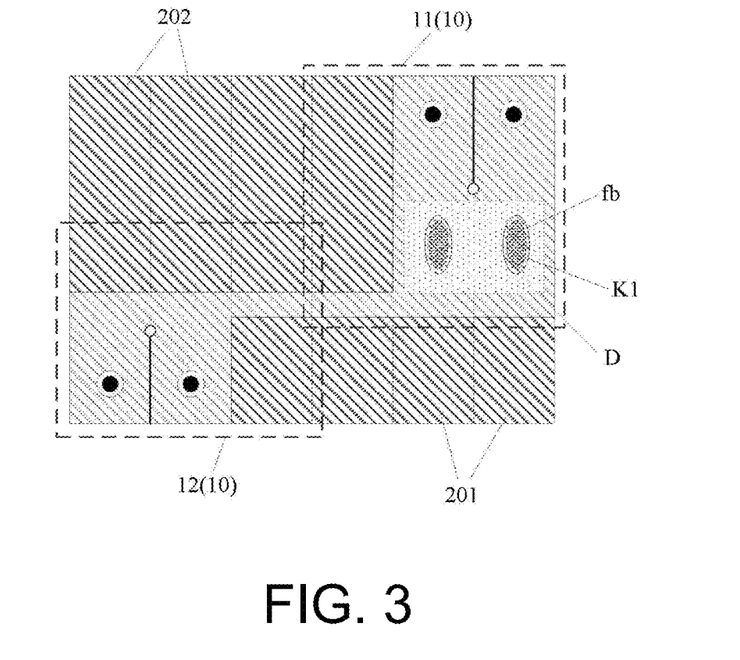
FIG. 3 is a schematic structural view of a third battery module provided in an embodiment of the disclosure.

The embodiment of the disclosure provides a battery module, as shown in FIG. 1 to FIG. 3, which may include: a jumper electrode connector 10, a first battery (such as 201) and a second battery (such as 202).

The jumper electrode connector 10 includes a first terminal 11 and a second terminal 12, the first terminal 11 is electrically connected to the first electrode of the first battery 201, and the second terminal 12 is electrically connected to the second electrode of the second battery 202.

Specifically, as shown in FIG. 1 and FIG. 2, the first battery 201 and the second battery 202 may be arranged adjacently, or, as shown in FIG. 3, the first battery 201 and the second battery 202 may also be arranged at intervals. The number of batteries arranged at intervals between the first battery 201 and the second battery 202 is not limited to the two shown in FIG. 3, but can also be set to one or three, etc., which can be set according to the actual situation, and the disclosure provides no limitation thereto. Such design can satisfy the need in different scenarios and improve the flexibility of design.

Moreover, as shown in FIG. 2, the number of the first battery 201 and the second battery 202 may both be one, or, as shown in FIG. 1 and FIG. 3, the number of the first battery 201 and the second battery 202 provided may both be two. Certainly, the number of the first battery 201 and the second battery 202 provided is not limited to those shown in FIG. 1 to FIG. 3, and the number of the first battery 201 and the second battery 202 provided can also be set to 4 or 6 and so on, which can be set based on the actual situation, and the disclosure provides no limitation thereto. Such design can satisfy the need in different scenarios and improve the flexibility of design.

The jumper electrode connector 10 includes a first through hole K1, the orthographic projection of the first through hole K1 on the first surface and the orthographic projection of the explosion-proof valve fb on the first surface at least partially overlap each other, and the first battery 201 and/or the second battery 202 include an explosion-proof valve fb, which is located in the first battery 201 and/or the second battery 202. The first surface is: a surface of the battery module provided with the jumper electrode connector (namely the surface shown in the figure).

Specifically, as shown in FIG. 3, the orthographic projection of the explosion-proof valve fb on the first surface is within the orthographic projection of the first through hole K1 on the first surface. Or, as shown in FIG. 1 and FIG. 2, the orthographic projection of the explosion-proof valve fb on the first surface partially overlaps the orthographic projection of the first through hole K1 on the first surface. Or, the orthographic projection of the first through hole K1 on the first surface is located in the orthographic projection of the explosion-proof valve fb on the first surface, which is not shown.

Moreover, regardless of whether it is the first battery or the second battery, or other batteries included in the battery module, each battery may include an explosion-proof valve, and the explosion-proof valve whose orthographic projection on the first surface overlaps the orthographic projection of the first through hole on the first surface may be the explosion-proof valve in the first battery, and may be the explosion-proof valve in the second battery, or may be the explosion-proof valves in the first battery and the second battery.

An insulating structure D is provided between the jumper electrode connector and the battery. The battery can be the first battery 201 and/or the second battery 202. The orthographic projection of the first through hole K1 on the first surface overlaps the orthographic projection of the insulating structure D on the first surface.

In order to describe the overlapping configuration and clearly show the insulation structure, in FIG. 1 to FIG. 3, the jumper electrode connector 10 is illustrated with transparency to clearly show the position relationship between the explosion-proof valve fb, the battery, the jumper electrode connector 10 and the insulating structures D, as well as the configuration relationship between the first through hole K1 and the explosion-proof valve fb.

By arranging the jumper electrode connector, the electrical connection between the first electrode of the first battery and the second electrode of the second battery can be realized, thereby facilitating realization of the connection relationship between multiple batteries. Moreover, since an insulating structure is provided between the jumper electrode connector and the battery, the insulating structure can provide insulation protection between the jumper electrode connector and the battery, thereby protecting the battery module and preventing foreign matter from entering the battery module, so as to improve the reliability of the battery module. Furthermore, since the jumper electrode connector includes the first through hole, the orthographic projection of the first through hole and the orthographic projection of the explosion-proof valve at least partially overlap each other, and the orthographic projection of the first through hole overlaps the orthographic projection of the insulating structure. Therefore, when the explosion-proof valve is opened, the gas and liquid released from the explosion-proof valve can break through the insulating structure and then be released through the first through hole, such that the safety of the battery module can be ensured.

To make one thing clear, the first battery and the second battery are different batteries, so that the electrical connection between the different batteries can be realized through the jumper electrode connectors, which facilitates to realize the connection of multiple batteries.

Optionally, in the embodiment of the disclosure, the shape of the first through hole K1 and the shape of the explosion-proof valve fb can be set to be the same, as shown in FIG. 2 and FIG. 3, that is, both are set to an oval shape. Certainly, their shapes are not limited to the oval shape, and both may be set to a circular shape, a polygon shape and so on, and may be set depending on actual needs, the disclosure provides no limitation thereto. Such design can satisfy the need in different scenarios and improve the flexibility of design.

Moreover, the shape of the first through hole K1 and the shape of the explosion-proof valve fb can also be set to be different. For example, as shown in FIG. 1, the first through hole K1 is set to be an oval shape, and the shape of the explosion-proof valve fb is set to be a circular shape. Certainly, the shapes of the first through hole K1 and the explosion-proof valve fb are not limited to those shown in FIG. 1, and can also be set to other shapes according to actual needs, the disclosure provides no limitation thereto. Such design can satisfy the need in different scenarios and improve the flexibility of design.

In specific implementation, in the embodiment of the disclosure, when the orthographic projection of the first through hole on the first surface overlaps the orthographic projection of the insulating structure on the first surface, there can be several situations as follows.

Situation 1:

Optionally, the orthographic projection of the first through hole on the first surface partially overlaps the orthographic projection of the insulating structure on the first surface, which is not shown.

Situation 2:

Optionally, the orthographic projection of the insulating structure on the first surface falls within the orthographic projection of the first through hole on the first surface, which is not shown.

Situation 3:

Optionally, in the embodiment of the disclosure, as shown in FIG. 1 to FIG. 3, the orthographic projection of the first through hole K1 on the first surface falls within the orthographic projection of the insulating structure D on the first surface.

In this way, the insulating structure can effectively block the communication between the first through hole and the inside of the battery module, and prevent foreign matter from entering the inside of the battery module through the first through hole, thereby effectively improving the reliability of the battery module.

In addition, effective insulation between the jumper electrode connector and the battery can be ensured, and short circuit between the two can be avoided, such that the safety and reliability of the battery module can be enhanced.

Certainly, in actual situations, when setting the first through hole and the insulating structure, selection can be made between the three situations described above depending on actual needs to meet the need of different scenarios and improve flexibility of design.

Figure 4:
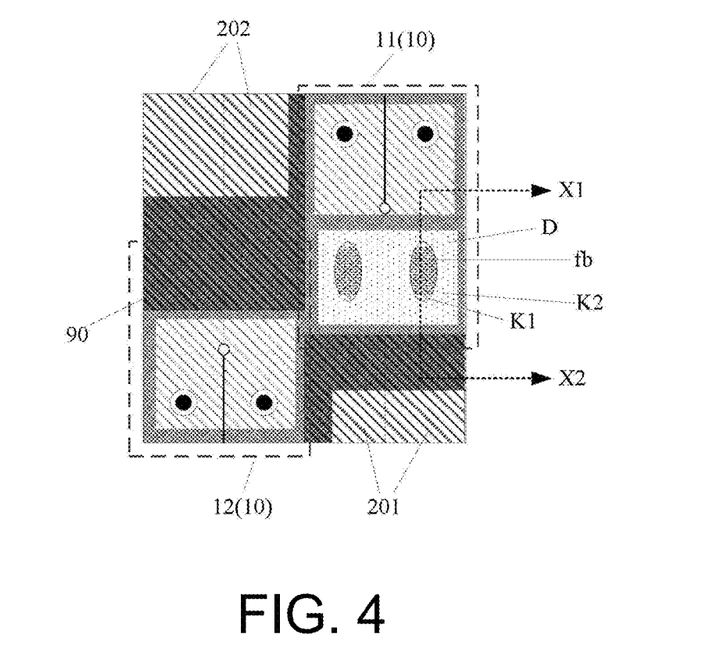
FIG. 4 is a schematic structural view of a fourth battery module provided in an embodiment of the disclosure.
Figure 5:
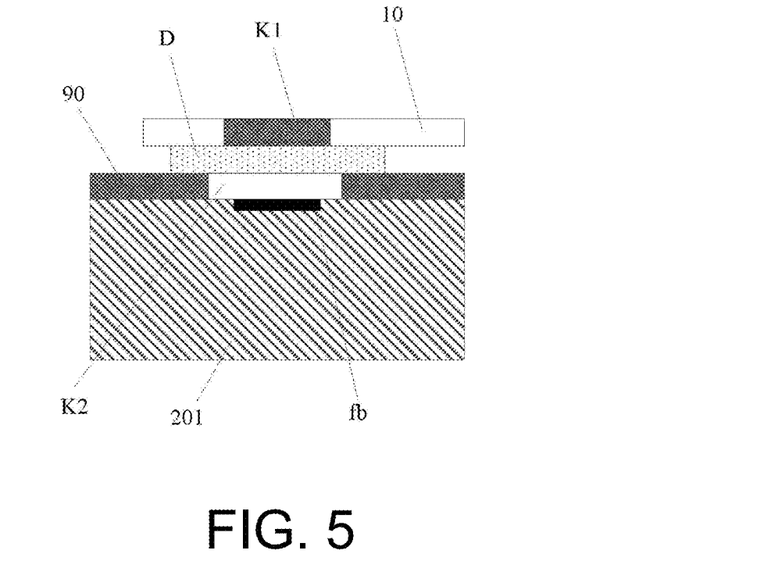
FIG. 5 is a cross-sectional view taken along the direction X1-X2 in FIG. 4.

Optionally, in the embodiment of the disclosure, as shown in FIG. 4 and FIG. 5, and FIG. 5 is a cross-sectional view taken along the direction X1-X2 in FIG. 4. To clearly show the battery below the wiring harness plate, only part of the structure of the wiring harness plate is shown in FIG. 4.

As shown in FIG. 4 and FIG. 5, the battery module further includes a wiring harness plate 90.

The wire harness plate 90 is arranged between the jumper electrode connector 10 and the battery (such as 201), and the insulating structure D is arranged between the jumper electrode connector 10 and the wiring harness plate 90.

The wiring harness plate 90 includes a second through hole K2, an orthographic projection of the second through hole K2 on the first surface, an orthographic projection of the first through hole K1 on the first surface, and an orthographic projection of the insulating structure D on the first surface at least partially overlap each other.

In this way, the fixing strength of the insulating structure can be increased, the displacement of the insulating structure can be avoided, and the insulating structure will not easily fall off. Moreover, the insulation between the battery and the jumper electrode connector can be ensured, and it is possible to prevent the foreign matter from entering the inside of the battery module, thereby improving the reliability and safety of the battery module.

Specifically, in the embodiment of the disclosure, as shown in FIG. 5, the orthographic projection of the first through hole K1 on the first surface falls within the orthographic projection of the second through hole K2 on the first surface, and the orthographic projection of the second through hole K2 on the first surface falls within the orthographic projection of the insulating structure D on the first surface.

In this way, the insulation between the battery and the jumper electrode connector can be further ensured, and it is possible to further prevent foreign matter from entering the inside of the battery module, thereby significantly improving the reliability and safety of the battery module.

Specifically, in the embodiment of the disclosure, the insulating structure may be a flexible insulating sheet, and the gas and liquid released from the explosion-proof valve can break through the flexible insulating sheet and be released to the outside of the battery module.

In this way, while increasing the insulation performance between the jumper electrode connector and the battery through the insulating structure, it is also possible to prevent foreign matter from entering the inside of the battery module, and gas and liquid can be released to the outside of the battery module when they are released by the explosion-proof valve.

Optionally, in the embodiment of the disclosure, the overlapping area of the orthographic projection of the first through hole on the first surface and the orthographic projection of the explosion-proof valve on the first surface is larger than 50% of the area of the first through hole.

In this way, the overlapping area of the orthographic projection of the first through hole on the first surface and the orthographic projection of the explosion-proof valve on the first surface is larger. Therefore, when a large amount of high-pressure gas and liquid are stored in the battery module, the releasing speed and efficiency of the gas and liquid can be improved, which prevents the high-pressure gas and liquid from affecting the internal structure of the battery module, especially for the battery. As such, while ensuring the safety of the battery, the reliability of the battery module can be improved.

Certainly, in actual situations, in order to further improve the safety of the battery module, when the battery swells, to ensure that the gas and liquid can be released quickly and effectively, the configuration can also be set as:

The overlapping area of the orthographic projection of the first through hole on the first surface and the orthographic projection of the explosion-proof valve on the first surface is greater than 60%, 70%, or 80% of the orthographic projection area of the first through hole on the first surface. That is, the larger the overlapping area of the orthographic projection of the first through hole on the first surface and the orthographic projection of the explosion-proof valve on the first surface is arranged, the more favorable it is for gas and liquid to be released quickly and efficiently.

Therefore, the overlapping area of the orthographic projection of the first through hole on the first surface and the orthographic projection of the explosion-proof valve on the first surface can be set according to the requirements for the safety level of the battery module, the disclosure provides no limitation thereto.

Optionally, in the embodiment of the disclosure, as shown in FIG. 3, the orthographic projection of the explosion-proof valve fb on the first surface falls within the orthographic projection of the first through hole K1 on the first surface.

In this way, it is possible to prevent the first through hole from blocking the explosion-proof valve, thereby preventing the gas and liquid from being obstructed by the first through hole when the gas and liquid are released from the explosion-proof valve. As such, it is possible to ensure that the gas and liquid can be released to the outside of the battery module through the explosion-proof valve and the first through hole, which effectively improves the reliability of the battery module.

Figure 6:
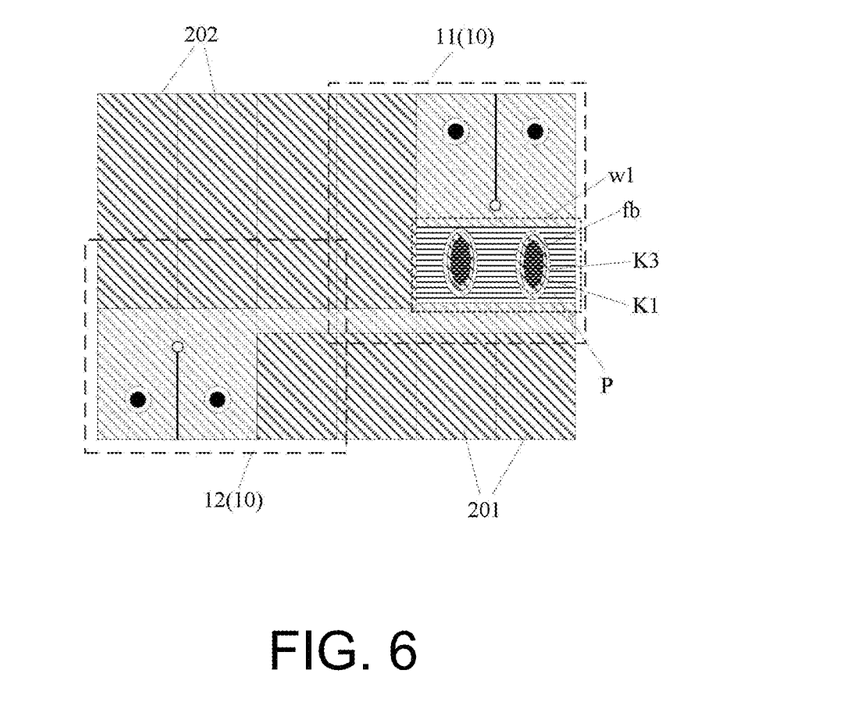
FIG. 6 is a schematic structural view of a fifth battery module provided in an embodiment of the disclosure.
Figure 7:
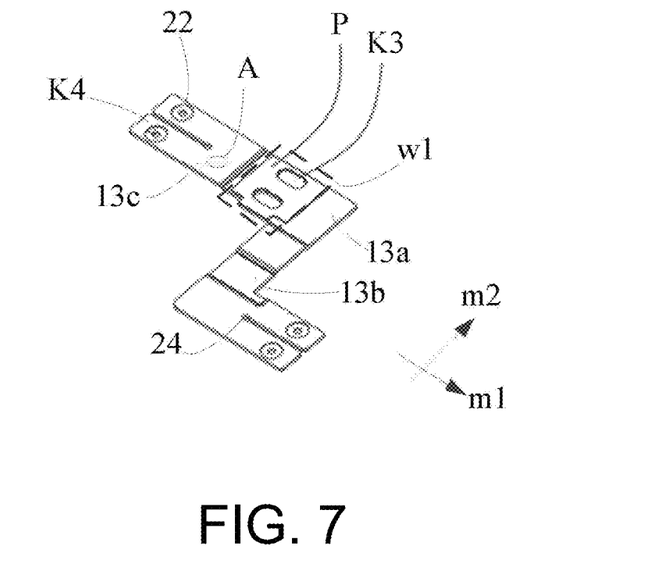
FIG. 7 is a schematic perspective view of a jumper electrode connector provided in an embodiment of the disclosure.

Optionally, in the embodiment of the disclosure, as shown in FIG. 6 and FIG. 7, specifically, in FIG. 6, to avoid complicated illustration of the structure, the wiring harness plate and the insulating structure are not shown; in FIG. 7, only the third through hole K3 is shown, but the explosion-proof valve and the first through hole are not shown.

As shown in FIG. 6 and FIG. 7, the jumper electrode connector 10 includes: an overcurrent enhancement region (as shown by the box w1 illustrated in dashed line).

The battery module further includes: an overcurrent sheet P located in the overcurrent enhancement region w1, and the overcurrent sheet P is electrically connected to the jumper electrode connector 10.

The overcurrent sheet P includes a third through hole K3, an orthographic projection of the first through hole K1 on the first surface, an orthographic projection of the third through hole K3 on the first surface, and an orthographic projection of the explosion-proof valve fb on the first surface at least partially overlap each other.

In this way, since the orthographic projection of the first through hole on the first surface, the orthographic projection of the third through hole on the first surface, and the orthographic projection of the explosion-proof valve on the first surface at least partially overlap each other, when the explosion-proof valve is opened, after the gas and liquid released from the explosion-proof valve break through the insulating structure, they can be released through the first through hole and the third through hole, which prevents the gas and liquid inside the battery from being suppressed inside the battery, thereby improving the safety of the battery.

Moreover, as shown in FIG. 7, since the first through hole K1 is provided in the overcurrent enhancement region w1, when a relatively large current flows through the overcurrent enhancement region w1, the first through hole K1 causes the resistance of the current enhancement region w1 to be smaller than the resistance of other regions (such as region A shown in FIG. 7). A large current can easily burn off the overcurrent enhancement region w1, and ultimately make it impossible to achieve the electrical connection between the first battery 201 and the second battery 202. If the overcurrent sheet P is arranged in the overcurrent enhancement region w1, the overcurrent sheet P is electrically connected to the jumper electrode connector 10, and the resistance of the overcurrent enhancement region w1 can be increased. Even if a relatively large current flows through the overcurrent enhancement region w1, it is possible to prevent the overcurrent enhancement region w1 from being burned, thereby ensuring the electrical connection between the first battery 201 and the second battery 202, and improving the reliability of the battery module.

Optionally, in the embodiment of the disclosure, the orthographic projection of the first through hole on the first surface, the orthographic projection of the third through hole on the first surface, and the orthographic projection of the explosion-proof valve on the first surface may be set to have the same shape or different shapes.

For example, as shown in FIG. 7, the shapes of the first through hole K1, the third through hole K3, and the explosion-proof valve fb are all oval shape, but they are not limited to the oval shape.

In other words, the shapes of the first through hole, the third through hole, and the explosion-proof valve can be set according to actual needs, the disclosure provides no limitation thereto.

Specifically, in the embodiment of the disclosure, the setting of the position relationship between the first through hole, the third through hole, and the explosion-proof valve fb may specifically involve the following situations:

Situation 1:

Optionally, in the embodiment of the disclosure, there is an overlapping region where the orthographic projection of the first through hole on the first surface and the orthographic projection of the explosion-proof valve on the first surface overlap each other, and the orthographic projection of the third through hole on the first surface partially overlaps the overlapping region.

Figure 8:
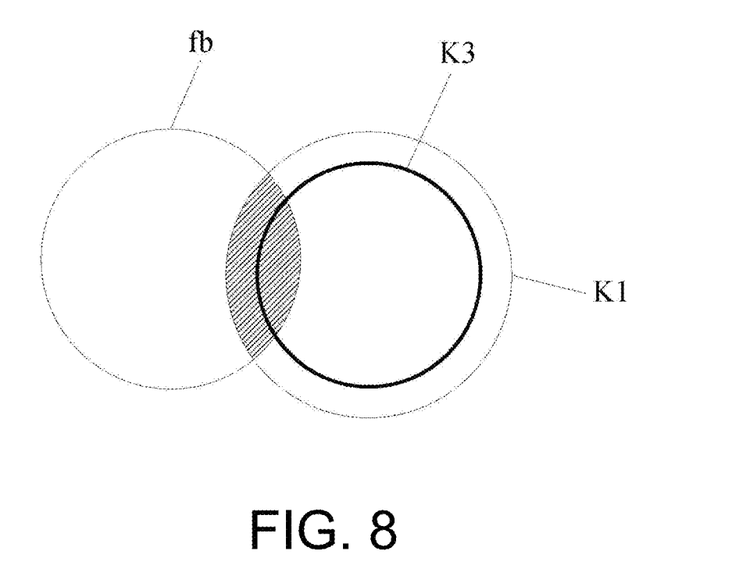
FIG. 8 is a schematic view of the positions of the first type of first through hole, the third through hole, and the explosion-proof valve provided in an embodiment of the disclosure.

For example, as shown in FIG. 8, the overlapping region where the orthographic projection of the first through hole K1 on the first surface overlaps the orthographic projection of the explosion-proof valve fb on the first surface is a diagonal-line filling region, and the orthographic projection of the third through hole K3 on the first surface only partially overlaps the overlapping region.

Figure 9:
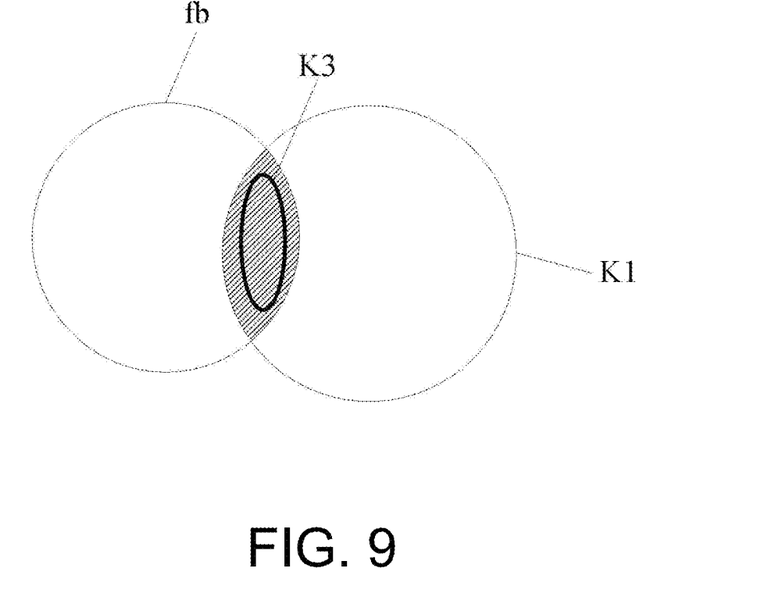
FIG. 9 is a schematic view of the positions of the second type of first through hole, the third through hole, and the explosion-proof valve provided in an embodiment of the disclosure.

Or, as shown in FIG. 9, the overlapping region where the orthographic projection of the first through hole K1 on the first surface overlaps the orthographic projection of the explosion-proof valve fb on the first surface is a diagonal-line filling region, and the orthographic projection of the third through hole K3 on the first surface is within the overlapping region.

In this way, if the explosion-proof valve is opened, the gas and liquid released from the explosion-proof valve can be released through the portion where the orthographic projection of the third through hole on the first surface overlaps the overlapping region, thereby preventing the gas and liquid from being suppressed in the battery, thereby improving the safety of the battery.

Situation 2:

Optionally, in the embodiment of the disclosure, there is an overlapping region where the orthographic projection of the first through hole on the first surface overlaps the orthographic projection of the explosion-proof valve on the first surface, and the overlapping region falls within the orthographic projection of the third through hole on the first surface.

Figure 10:
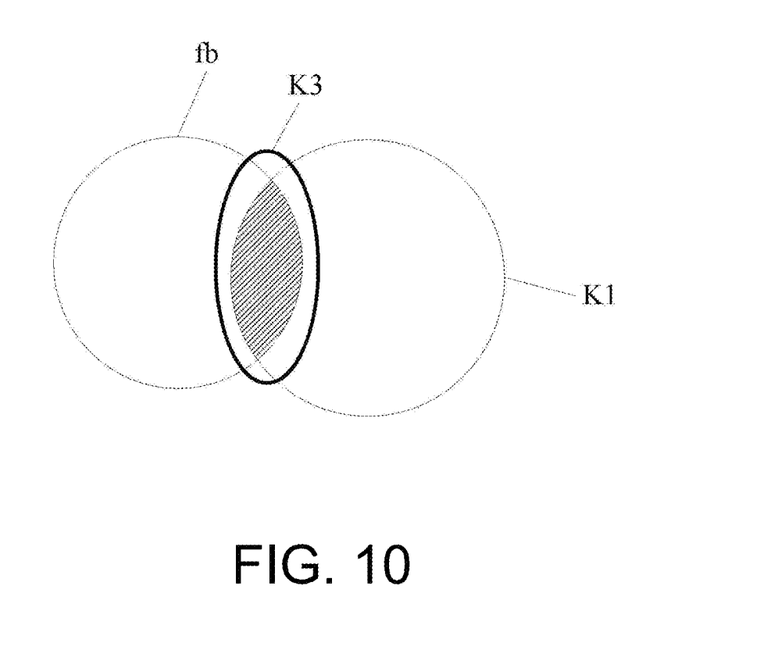
FIG. 10 is a schematic view of the positions of the third type of first through hole, the third through hole, and the explosion-proof valve provided in an embodiment of the disclosure.

For example, as shown in FIG. 10, the orthographic projection of the third through hole K3 on the first surface only encloses the overlapping region, and the orthographic projection of the third through hole K3 on the first surface partially overlaps the orthographic projection of the explosion-proof valve fb on the first surface and the orthographic projection of the first through hole K1 on the first surface respectively.

Figure 11:
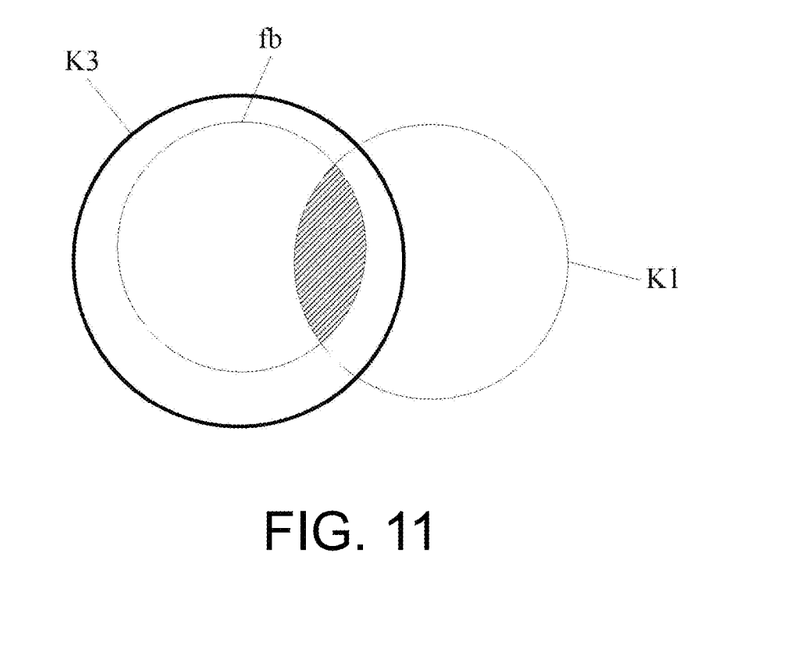
FIG. 11 is a schematic view of the positions of the fourth type of first through hole, the third through hole, and the explosion-proof valve provided in an embodiment of the disclosure.

Or, as shown in FIG. 11, the orthographic projection of the third through hole K3 on the first surface not only encloses the overlapping region, but also encloses the orthographic projection of the explosion-proof valve fb on the first surface, and the orthographic projection of the third through hole K3 on the first surface partially overlaps the orthographic projection of the first through hole K1 on the first surface.

Figure 12:
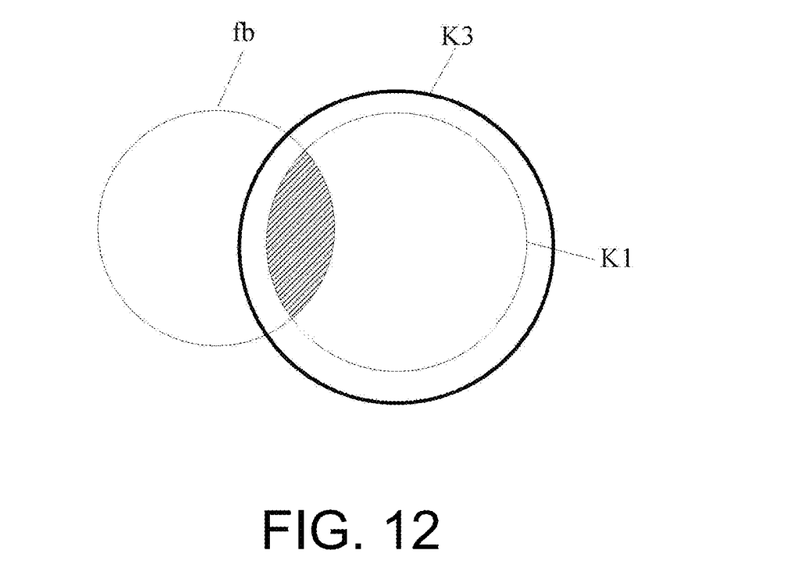
FIG. 12 is a schematic view of the positions of the fifth type of first through hole, the third through hole, and the explosion-proof valve provided in an embodiment of the disclosure.

Or, as shown in FIG. 12, the orthographic projection of the third through hole K3 on the first surface not only encloses the overlapping region, but also encloses the orthographic projection of the first through hole K1 on the first surface, and the orthographic projection of the third through hole K3 on the first surface partially overlaps the orthographic projection of the explosion-proof valve fb on the first surface.

In this way, the size of the aperture for releasing gas and liquid can be increased. If the explosion-proof valve is opened, other gas and liquid inside the battery can be released through the overlapping region where the orthographic projection of the first through hole overlaps the orthographic projection of the explosion-proof valve. As such, the releasing speed of gas and liquid is further increased, the releasing efficiency is further enhanced, and the safety and reliability of the battery module are further improved.

Situation 3:

Optionally, in the embodiment of the disclosure, the orthographic projection of the first through hole on the first surface falls within the orthographic projection of the third through hole on the first surface, and the orthographic projection of the explosion-proof valve on the first surface falls within the orthographic projection of the first through hole on the first surface.

For example, as shown in FIG. 6, the explosion-proof valve fb, the first through hole K1 and the third through hole K3 are arranged in sequence from the inside to the outside and from small to large.

Alternatively, the areas of the explosion-proof valve, the first through hole and the third through hole are set to be completely the same, which are not shown.

In this way, the size of aperture for releasing gas and liquid can be greatly increased. If the explosion-proof valve is opened, other gas and liquid inside the battery can be released through the explosion-proof valve, thereby maximizing the releasing speed of gas and liquid, maximizing the releasing efficiency, and maximizing the safety and reliability of the battery module.

Specifically, in the embodiment of the disclosure, the arrangement of the overcurrent sheet and the jumper electrode connector may specifically include:

Method 1:

Optionally, in the embodiment of the disclosure, the overcurrent sheet and the jumper electrode connector may be integrally provided.

That is to say, the overcurrent sheet and the jumper electrode connector are manufactured by an integral molding method.

In this way, when the jumper electrode connector is made, the overcurrent sheet can be manufactured, which not only simplifies the manufacturing process of the jumper electrode connector, reduces the manufacturing steps of the jumper electrode connector, but also helps simplify the structure of the jumper electrode connector, such that the structure of the jumper electrode connector is optimized.

In addition, the arrangement of the overcurrent sheet can also increase the structural strength of the jumper electrode connector, reduce the risk of damage to the jumper electrode connector, and improve the reliability of the jumper electrode connector, thereby improving the reliability of the battery module.

Specifically, in the embodiment of the disclosure, the overcurrent sheet may be fixed to one side of the jumper electrode connector away from the first battery after being bent, or the overcurrent sheet may be fixed to one side of the jumper electrode connector close to the first battery after being bent.

Figure 13:
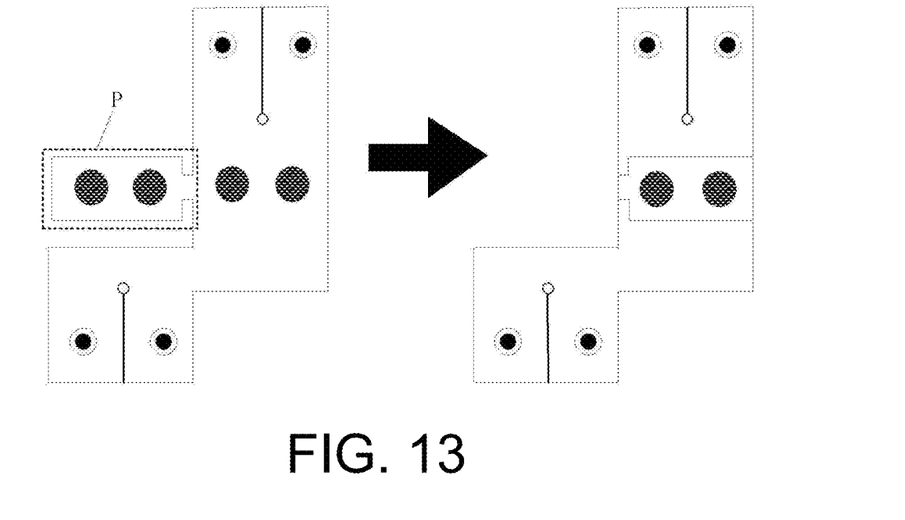
FIG. 13 is a schematic view of the position of the overcurrent sheet and the jumper electrode connector provided in an embodiment of the disclosure.

For example, the figure on the left of FIG. 13 shows the situation when the overcurrent sheet P has not been bent, indicating that the overcurrent sheet P and the jumper electrode connector are integrally arranged. The figure on the right of FIG. 13 shows that the overcurrent sheet has been bent, and after the overcurrent sheet is bent, the overcurrent sheet is fixed to one side of the jumper electrode connector away from the first battery.

The situation where the overcurrent sheet is fixed to one side of the jumper electrode connector close to the first battery after being bent is not shown in the figure.

In this way, when the jumper electrode connector is made, the overcurrent sheet can be manufactured, which can simplify the manufacturing process of the jumper electrode connector. After the overcurrent sheet is bent, the final jumper electrode connector can be obtained. When the battery swells, it can be ensured that gas and liquid can be released quickly and effectively, such that the safety and reliability of the battery module can be improved.

Optionally, in the embodiment of the disclosure, the overcurrent sheet is fixed by welding, riveting or pressing.

In this way, it is advantageous for the overcurrent sheet to be fixed to one side of the jumper electrode connector away from the first battery (or one side of the jumper electrode connector close to the first battery), thus obtaining the final jumper electrode connector. When a large amount of high-pressure gas and liquid are stored in the battery module, it can be ensured that the gas and liquid can be released quickly and effectively, avoiding the impact of high-pressure gas and liquid on the internal structure of the battery module. Furthermore, the structural strength of the jumper electrode connector can be improved, while the safety of the battery can be ensured, the reliability of the battery module can be enhanced as well.

Method 2:

Optionally, in the embodiment of the disclosure, the overcurrent sheet and the jumper electrode connector are separately arranged, and are electrically connected by welding, riveting or pressing.

In this way, through the simple approach described above, the electrical connection between the overcurrent sheet and the jumper electrode connector can be realized, and the utility is high. Moreover, in actual situations, if the overcurrent sheet needs to be replaced, since the overcurrent sheet and the jumper electrode connector are set separately, the overcurrent sheet can be replaced directly without replacing the jumper electrode connector, which can save cost.

Optionally, in the embodiment of the disclosure, the overcurrent sheet can be made of metal materials.

For example, metal copper, metal aluminum, or metal nickel can be adopted to manufacture the overcurrent sheet, selection of the material may be made according to the actual situation, the disclosure provides no limitation thereto.

Optionally, in the embodiment of the disclosure, as shown in FIG. 7, the jumper electrode connector is further provided with a buffering portion 13b in a bent shape, and the buffering portion 13b is stretched or shrunk along the arrangement direction (as direction m2 shown in the figure) of each battery under the action of external force.

Specifically, the specific realization of the bending shape can include: V-shape, Z-shape, wave shape, protrusion shape or groove shape, etc., as long as the deformation takes place under the action of external force. The disclosure provides no specific limitation to the specific realization of the bending shape.

In this way, when the battery swells, the buffering portion 13b can perform a certain buffering effect to prevent the jumper electrode connector from being pulled and broken when the battery swells, so as to improve the reliability of the jumper electrode connector.

Certainly, the position of the buffering portion is not limited to that shown in FIG. 7, and the buffering portion can be provided at other positions as long as it can avoid pulling and breaking of the jumper electrode connector caused by the force of the battery swelling. The disclosure provides no limitation to the specific position of the buffering portion.

In the meantime, the buffering portion 13b can be buckled and fixed to the wiring harness plate (not shown in the figure) when the battery module is assembled, so as to realize the effective assembly of the battery module and prevent the structures from being shifted relatively during assembly and use.

Optionally, in the embodiment of the disclosure, as shown in FIG. 7, the jumper electrode connector 10 may further include: a fourth through hole K4, a counterbore 22, recesses (13a and 13c), and a crack stopper 24.

Specifically, the fourth through hole K4 can realize the electrical connection between the jumper electrode connector 10 and the battery as well as the positioning of the battery module.

In terms of the counterbore 22, the thickness of the region where the counterbore 22 is located can be reduced, thereby facilitating realization of the thin design of the battery module. Moreover, when assembling is performed by laser welding equipment, the power required by the laser welding equipment can be reduced, thus facilitating to save energy.

To make one thing clear, when the thickness of the region shown in the circle A drawn in dashed line in FIG. 7 is thin, the counterbore may not be provided under the circumstances. Therefore, the difficulty of manufacturing the jumper electrode connector can be reduced and the manufacturing efficiency can be improved.

For the recesses (13a and 13c), with respect to the recess 13a, the overcurrent sheet P can be placed in the recess 13a; and the depth of the recess 13a can be set as:

Greater than or equal to the thickness of the overcurrent sheet P;

Or, less than the thickness of the overcurrent sheet P.

As long as the recess 13a can be provided to avoid the increase in the thickness of the jumper electrode connector after the overcurrent sheet is disposed, the disclosure provides no specific limitation to the depth of the recess 13a.

With respect to the recess 13c, the signal acquisition structure can be placed in the recess 13c. Since the signal acquisition structure has a certain thickness, the signal acquisition structure is placed in the recess 13c to avoid the increase in the thickness of the battery module. As such, the thickness of the battery module can be reduced, so as to facilitate realization of thin design of the battery module.

For the crack stopper 24, when swelling occurs to adjacent batteries, the crack stopper 24 can perform a certain buffering effect to prevent the jumper electrode connector 10 from being pulled apart.

In addition, in the embodiment of the disclosure, the maximum thickness of the jumper electrode connector 10 can be but not limited to 2.5 mm. Certainly, the thickness of the jumper electrode connector 10 can be set according to actual overcurrent requirements to meet the needs of different application scenarios and to improve flexibility of design.

Figure 14:
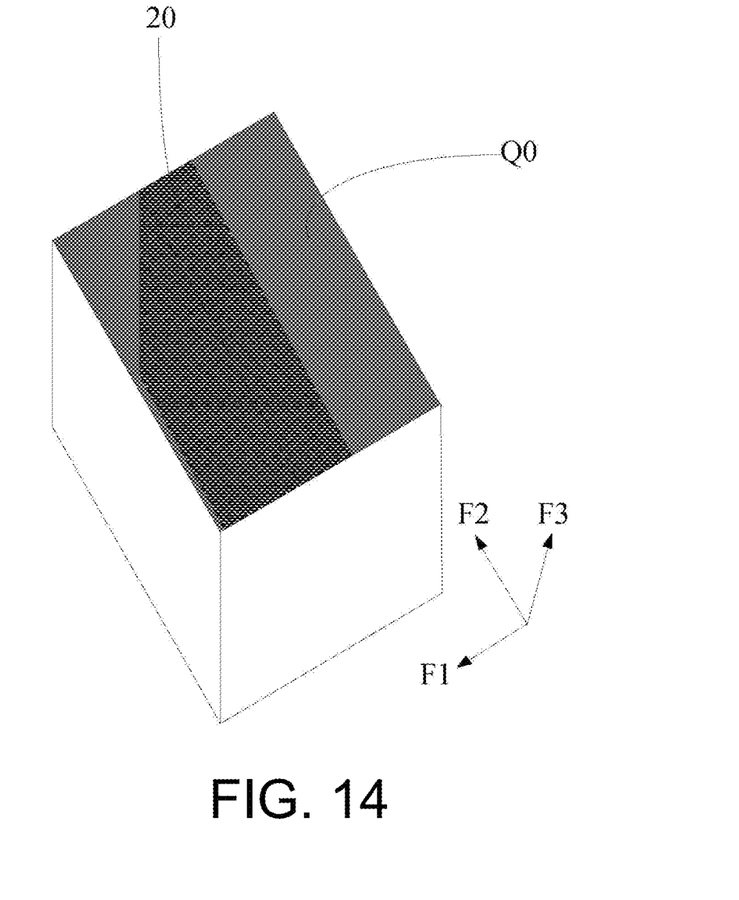
FIG. 14 is a schematic structural view of a cavity provided in an embodiment of the disclosure.

Optionally, in the embodiment of the disclosure, as shown in FIG. 14, the battery module may include: a cavity Q0 having an opening for accommodating the battery 20.

Therefore, the battery 20 can be placed inside the cavity Q0, and the size of the cavity Q0 determines the number of batteries 20 placed, which can be set according to actual needs, and the disclosure provides no limitation thereto.

Figure 15:
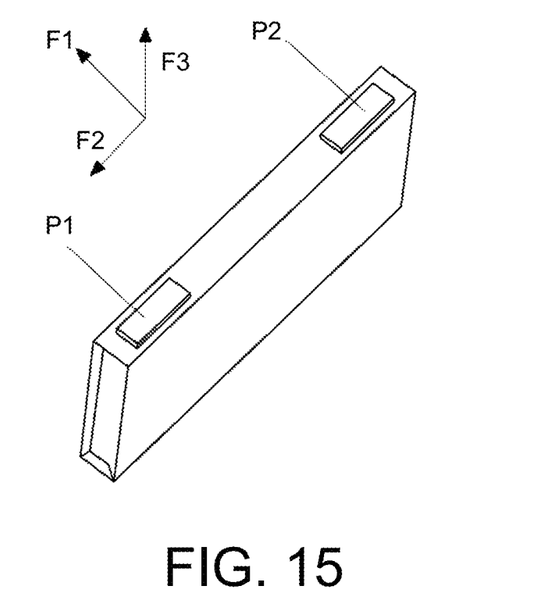
FIG. 15 is a schematic structural view of a battery provided in an embodiment of the disclosure.

In addition, the jumper electrode connector is typically arranged at the opening, covering the top of the battery, that is, covering the battery along the direction F3 in FIG. 14. Please refer to the structure of the battery shown in FIG. 15, the jumper electrode connector can be electrically connected with the first electrode P1 and the second electrode P2 of the battery, thereby realizing the connection relationship between the batteries.

Figure 16:
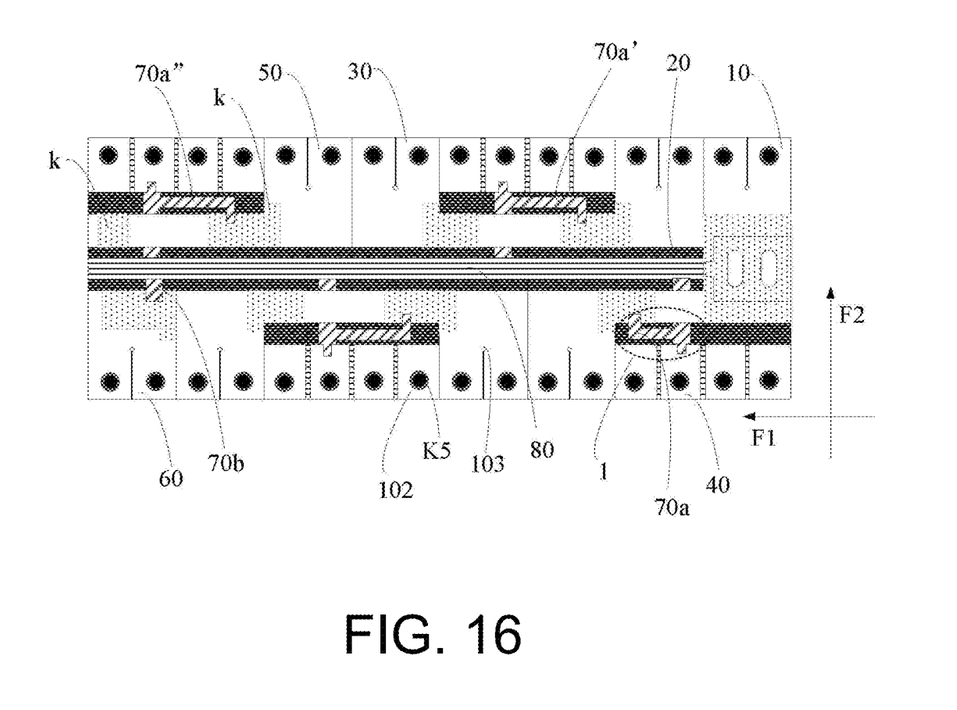
FIG. 16 is a schematic structural view of a sixth battery module provided in an embodiment of the disclosure.

Optionally, in the embodiment of the disclosure, as shown in FIG. 16, since there are many structures in the figure, to avoid complicated illustration of the structures, the wiring harness plate and the insulating structure are not shown in the figure. In addition to the jumper electrode connector 10, the battery module may further include a spacer electrode connector 30, an adjacent electrode connector 40, and a total positive transmission electrode connector 50 as well as a total negative transmission electrode connector 60.

The spacer electrode connector 30 is adopted to connect a plurality of batteries 20 arranged at intervals, the adjacent electrode connector 40 is adopted to connect a plurality of adjacent batteries 20, and the total positive transmission electrode connector 50 and the total negative transmission electrode connector 60 are respectively electrically connected to the external equipment to realize input and output of signals.

Specifically, the spacer electrode connector 30 can be electrically connected to four batteries. These four batteries include a first group of batteries and a second group of batteries, and four batteries (as shown in FIG. 16), two batteries (not shown) or six batteries (not shown) can be arranged between the first group of batteries and the second group of batteries. Moreover, the number of batteries included in the first group of batteries and the second group of batteries is the same, which can be one (not shown), two (as shown in FIG. 16) or other numbers. The number of batteries can be determined according to the number of batteries included in the battery module, the connection relationship between the batteries and so on, the disclosure provides no limitation thereto.

The adjacent electrode connector 40 can be electrically connected to four batteries (as shown in FIG. 16), certainly, the adjacent electrode connector 40 can also be electrically connected to two (not shown) or six (not shown) batteries, which can be determined according to the number of batteries included in the battery module, the connection relationship between the batteries and so on, the disclosure provides no limitation thereto.

Figure 17:
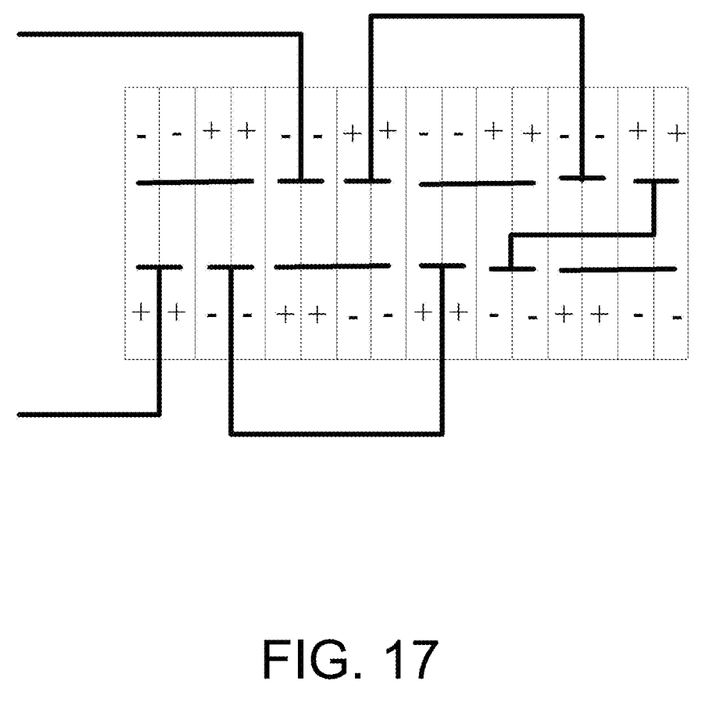
FIG. 17 is a schematic view of the connection relationship of the batteries provided in an embodiment of the disclosure.

Therefore, by arranging the spacer electrode connector 30, the adjacent electrode connector 40, the total positive transmission electrode connector 50 and the total negative transmission electrode connector 60, as well as the jumper electrode connector 10, the electrical connection of multiple batteries can be realized. As shown in FIG. 16, the figure shows 16 batteries arranged along the direction F1, through the arrangement of the spacer electrode connector 30, the adjacent electrode connector 40, the total positive transmission electrode connector 50 and the total negative transmission electrode connector 60, as well as the jumper electrode connector 10, the connection relationship between the 16 batteries 20 can be as shown in FIG. 17.

In addition, the total positive transmission electrode connector 50 and the total negative transmission electrode connector 60 can be arranged on the same side of the battery module, as shown in FIG. 16, thereby facilitating wiring, reducing the complexity of wiring, and also facilitating to reduce the length of wiring, thereby optimizing the structure of the battery module.

Specifically, in the embodiment of the disclosure, as shown in FIG. 16, the spacer electrode connector 30 and the adjacent electrode connector 40 may also include:

The fifth through hole K5, the counterbore 102, the crack stopper 103, and the buffering portion k.

Specifically, the fifth through hole K5, the counterbore 102, the crack stopper 103, and the buffering portion k can be arranged in a manner similar to the arrangement of the fourth through hole, the counterbore, the crack stopper, and the buffering portion in the jumper electrode connector 10. Please refer to the above content for details, and no further description will be narrated herein.

Optionally, in the embodiment of the disclosure, as shown in FIG. 16, the battery module may further include: a signal acquisition structure (such as 70*a*, 70*b*, and 70*a*') and a flexible circuit board 80.

Taking the signal acquisition structure 70*a* as an example, the first terminal of the signal acquisition structure 70*a* is electrically connected to the jumper electrode connector 10 and the adjacent electrode connector 40 respectively, and the second terminal is electrically connected to the flexible circuit board 80.

In this way, through the signal acquisition structure, the voltage signal and temperature signal on the jumper electrode connector can be collected (if the signal acquisition structure is a temperature acquisition structure), so that the collected signals can be transmitted to the flexible circuit board, thereby achieving analysis and control of the battery module.

Specifically, as shown in FIG. 16, with respect to the signal acquisition structure (temporarily referred to as the first signal acquisition structure) 70*a* for collecting temperature signals and voltage signals of the jumper electrode connector 10, the jumper electrode connector 10 partially surrounds the adjacent electrode connector 40, under the circumstances, the first signal acquisition structure 70*a* may specifically include:

A transmission part (not marked with a reference sign) arranged to overlap with the jumper electrode connector 10 is adopted to transmit temperature signals and voltage signals.

The acquisition portion (as shown by the circle 1 drawn in dashed line) electrically connected to the jumper electrode connector 10 and the adjacent electrode connector 40 respectively is utilized to collect the voltage signal and temperature signal of the jumper electrode connector 10, and collect the voltage signal and temperature signal of the adjacent electrode connector 40.

Moreover, since the buffering portion is provided in the jumper electrode connector 10, the region k filled with sparse black dots in FIG. 16 indicates the position of the buffering portion, so that there is a gap between the region between the two buffering portions and the battery. As such, the transmission portion in the first signal acquisition structure can pass through the gap, so that the structure of the battery module can be optimized.

Alternatively, the transmission portion in the first signal acquisition structure may further pass through the recess in the buffering portion k instead of passing through the gap.

In addition, a gap or an insulating structure can be provided between the transmission portion and the jumper electrode connector 10 to avoid a short circuit between the transmission portion and the jumper electrode connector 10, thereby avoiding the collection of voltage signals and temperature signals, thus realizing effective control of the battery module.

Further referring to FIG. 16, when the spacer electrode connector 30 partially surrounds the adjacent electrode connector 40, the structure of the signal acquisition structure (temporarily referred to as the second signal acquisition structure) 70*a*' electrically connected to the spacer electrode connector 30 and the adjacent electrode connector 40 respectively may be set in a manner similar to the structure of the first signal acquisition structure 70*a*. As such, on basis of the structure of the optimized battery module, the voltage signal and the temperature signal respectively collected from the spacer electrode connector 30 and the adjacent electrode connector 40 can be transmitted to the flexible circuit board 80.

Similarly, with respect to the total positive transmission electrode connector 50 mentioned in the foregoing, as shown in FIG. 16, when the total positive transmission electrode connector 50 partially surrounds the adjacent electrode connector 40, the structure of the signal acquisition structure (temporarily referred to as the third signal acquisition structure) 70*a*" electrically connected to the total positive transmission electrode connector 50 and the adjacent electrode connector 40 respectively may be set in a manner similar to the structure of the first signal acquisition structure 70*a*. As such, on basis of the structure of the optimized battery module, the voltage signal and the temperature signal respectively collected from the total positive transmission electrode connector 50 and the adjacent electrode connector 40 can be transmitted to the flexible circuit board 80.

Further referring to FIG. 16, the signal acquisition structure (temporarily referred to as the fourth signal acquisition structure) 70*b* for collecting the temperature signal and voltage signal of the total negative transmission electrode connector 60 may specifically include:

An acquisition portion electrically connected to the total negative transmission electrode connector 60 is utilized to collect the voltage signal and temperature signal of the total negative transmission electrode connector 60.

To make one thing clear, the specific arrangement of the above-mentioned signal acquisition structures is associated with the structure arrangement and positions of the electrode connectors (including the jumper electrode connector 10, the spacer electrode connector 30, the adjacent electrode connector 40, and the total positive transmission electrode connector 50 as well as the total negative transmission electrode connector 60 mentioned in the above content) connected thereto. As long as the temperature signal and voltage signal of the electrode connectors can be acquired, the disclosure provides no limitation to the structure arrangement of the signal acquisition structure.

Apparently, those skilled in the art can make various changes and modifications to the disclosure without departing from the spirit and scope of the disclosure. In that case, if these modifications and variations of the disclosure fall within the scope of the claims of the disclosure and equivalent technologies, the disclosure is also intended to include these modifications and variations.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A battery module, comprising: a jumper electrode connector, a first battery and a second battery;
    wherein the jumper electrode connector comprises a first terminal and a second terminal, the first terminal is electrically connected to a first electrode of the first battery, and the second terminal is electrically connected to a second electrode of the second battery;
    the jumper electrode connector comprises a first through hole, wherein an orthographic projection of the first through hole on a first surface and an orthographic projection of an explosion-proof valve on the first surface at least partially overlap each other, and the first battery and/or the second battery comprise the explosion-proof valve;
    the first surface is: a surface of the battery module provided with the jumper electrode connector;
    an insulating structure located outside of the first battery and the second battery and is provided between and separating the jumper electrode connector and the explosion-proof valve of the battery, the battery is the first battery and/or the second battery, the insulating structure has a top surface and a bottom surface opposite to the top surface, the top surface is in direct contact with the jumper electrode connector and blocking the first through hole, and the bottom surface is facing the explosion-proof valve and blocking the explosion-proof valve, and the orthographic projection of the first through hole on the first surface falls within an orthographic projection of the insulating structure on the first surface.

2. The battery module according to claim 1, wherein the jumper electrode connector comprises: an overcurrent enhancement region;
    wherein the battery module further comprises: an overcurrent sheet located in the overcurrent enhancement region, and the overcurrent sheet is electrically connected to the jumper electrode connector;
    the overcurrent sheet comprises a third through hole, wherein the orthographic projection of the first through hole on the first surface, an orthographic projection of the third through hole on the first surface, and the orthographic projection of the explosion-proof valve on the first surface at least partially overlap each other.

3. The battery module according to claim 2, wherein there is an overlapping region where the orthographic projection of the first through hole on the first surface and the orthographic projection of the explosion-proof valve on the first surface overlap each other, and the overlapping region falls within the orthographic projection of the third through hole on the first surface.

4. The battery module according to claim 3, wherein the orthographic projection of the first through hole on the first surface falls within the orthographic projection of the third through hole on the first surface.

5. The battery module according to claim 2, wherein the overcurrent sheet and the jumper electrode connector are integrally arranged;
    or, the overcurrent sheet and the jumper electrode connector are arranged separately, and are electrically connected by welding, riveting or pressing.

6. The battery module according to claim 1, wherein the battery module further comprises a wiring harness plate;
    the wiring harness plate is arranged between the jumper electrode connector and the battery, and the insulating structure is arranged between the jumper electrode connector and the wiring harness plate;
    the wiring harness plate comprises a second through hole, wherein an orthographic projection of the second through hole on the first surface, the orthographic projection of the first through hole on the first surface, and the orthographic projection of the insulating structure on the first surface at least partially overlap each other.

7. The battery module according to claim 6, wherein the jumper electrode connector comprises: an overcurrent enhancement region;
    wherein the battery module further comprises: an overcurrent sheet located in the overcurrent enhancement region, and the overcurrent sheet is electrically connected to the jumper electrode connector;
    the overcurrent sheet comprises a third through hole, wherein the orthographic projection of the first through hole on the first surface, an orthographic projection of the third through hole on the first surface, and the orthographic projection of the explosion-proof valve on the first surface at least partially overlap each other.

8. The battery module according to claim 7, wherein there is an overlapping region where the orthographic projection of the first through hole on the first surface and the orthographic projection of the explosion-proof valve on the first surface overlap each other, and the overlapping region falls within the orthographic projection of the third through hole on the first surface.

9. The battery module according to claim 6, wherein the orthographic projection of the first through hole on the first surface falls within the orthographic projection of the second through hole on the first surface, and the orthographic projection of the second through hole on the first surface falls within the orthographic projection of the insulating structure on the first surface.

10. The battery module according to claim 9, wherein the jumper electrode connector comprises: an overcurrent enhancement region;
   wherein the battery module further comprises: an overcurrent sheet located in the overcurrent enhancement region, and the overcurrent sheet is electrically connected to the jumper electrode connector;
   the overcurrent sheet comprises a third through hole, wherein the orthographic projection of the first through hole on the first surface, an orthographic projection of the third through hole on the first surface, and the orthographic projection of the explosion-proof valve on the first surface at least partially overlap each other.

11. The battery module according to claim 10, wherein there is an overlapping region where the orthographic projection of the first through hole on the first surface and the orthographic projection of the explosion-proof valve on the first surface overlap each other, and the overlapping region falls within the orthographic projection of the third through hole on the first surface.

12. The battery module according to claim 1, wherein an overlapping area of the orthographic projection of the first through hole on the first surface and an orthographic projection of the explosion-proof valve on the first surface is larger than 50% of an area of the first through hole.

13. The battery module according to claim 12, wherein the jumper electrode connector comprises: an overcurrent enhancement region;
   wherein the battery module further comprises: an overcurrent sheet located in the overcurrent enhancement region, and the overcurrent sheet is electrically connected to the jumper electrode connector;
   the overcurrent sheet comprises a third through hole, wherein the orthographic projection of the first through hole on the first surface, an orthographic projection of the third through hole on the first surface, and the orthographic projection of the explosion-proof valve on the first surface at least partially overlap each other.

14. The battery module according to claim 13, wherein there is an overlapping region where the orthographic projection of the first through hole on the first surface and the orthographic projection of the explosion-proof valve on the first surface overlap each other, and the overlapping region falls within the orthographic projection of the third through hole on the first surface.

15. The battery module according to claim 12, wherein the orthographic projection of the explosion-proof valve on the first surface falls within the orthographic projection of the first through hole on the first surface.

16. The battery module according to claim 15, wherein the jumper electrode connector comprises: an overcurrent enhancement region;
   wherein the battery module further comprises: an overcurrent sheet located in the overcurrent enhancement region, and the overcurrent sheet is electrically connected to the jumper electrode connector;
   the overcurrent sheet comprises a third through hole, wherein the orthographic projection of the first through hole on the first surface, an orthographic projection of the third through hole on the first surface, and the orthographic projection of the explosion-proof valve on the first surface at least partially overlap each other.

17. The battery module according to claim 16, wherein there is an overlapping region where the orthographic projection of the first through hole on the first surface and the orthographic projection of the explosion-proof valve on the first surface overlap each other, and the overlapping region falls within the orthographic projection of the third through hole on the first surface.

* * * * *